(12) United States Patent
Jemelka et al.

(10) Patent No.: US 12,092,566 B2
(45) Date of Patent: Sep. 17, 2024

(54) ENCAPSULATING OF PHOTOACOUSTIC DETECTOR

(71) Applicant: Honeywell International Inc., Charlotte, NC (US)

(72) Inventors: Ondřej Jemelka, Kokory (CZ); Radek Stupka, Brno (CZ); Milos Koutny, Brno (CZ); Michal Bohuš, Brno (CZ); Jan Dvorak, Lelekovice (CZ); Tomáš Křenek, Ivančice (CZ)

(73) Assignee: Honeywell International Inc., Charlotte, NC (US)

( * ) Notice: Subject to any disclaimer, the term of this patent is extended or adjusted under 35 U.S.C. 154(b) by 332 days.

(21) Appl. No.: 17/659,691

(22) Filed: Apr. 19, 2022

(65) Prior Publication Data

US 2023/0333005 A1    Oct. 19, 2023

(51) Int. Cl.
*G01N 21/17* (2006.01)
*G01N 21/3504* (2014.01)

(52) U.S. Cl.
CPC ..... *G01N 21/1702* (2013.01); *G01N 21/3504* (2013.01); *G01N 2021/1704* (2013.01)

(58) Field of Classification Search
CPC ........... G01N 21/1702; G01N 21/3504; G01N 2021/1704; G01N 29/245; G01N 29/36; G01N 29/2418; G01N 2291/02809; B29C 65/00; B29C 65/02; B29C 65/48; B29C 66/00; B29C 66/45; B29C 66/73365; B29C 66/73366
USPC ..... 156/60, 69, 87, 145, 146, 147, 293, 296, 156/297; 73/24.02, 643, 655
See application file for complete search history.

(56) References Cited

U.S. PATENT DOCUMENTS

| | | |
|---|---|---|
| 2016/0313288 A1 | 10/2016 | Theuss et al. |
| 2019/0170702 A1 | 6/2019 | Eberl et al. |
| 2021/0055207 A1 | 2/2021 | Mittereder et al. |
| 2021/0181158 A1 | 6/2021 | Schaller et al. |

FOREIGN PATENT DOCUMENTS

| | | |
|---|---|---|
| DE | 102019214478 A1 | 3/2021 |
| DE | 102019125963 | 4/2021 |

OTHER PUBLICATIONS

European search report Mailed on Aug. 2, 2023 for EP Application No. 23166827, 7 page(s).

*Primary Examiner* — Philip C Tucker
*Assistant Examiner* — Brian R Slawski
(74) *Attorney, Agent, or Firm* — Alston & Bird LLP

(57) ABSTRACT

Methods, apparatuses, and systems for providing a sealed glass enclosure for a gas detecting apparatus are provided. An example method may include: preparing a controller component that is operatively coupled to a sensing element, wherein the controller component comprises at least one electrical connector; joining a first glass component and a second glass component to form a unitary body such that the at least one electrical connector is disposed therebetween; preparing a glass tube comprising an open surface; disposing the controller component and sensing element within the glass tube; positioning the unitary body comprising the first glass component and the second glass component adjacent the open surface of the glass tube; and encapsulating the unitary body to the glass tube to form the sealed glass enclosure.

20 Claims, 6 Drawing Sheets

ENCAPSULATING OF PHOTOACOUSTIC DETECTOR

BACKGROUND

Gas detectors may detect and/or measure a concentration level of gaseous substance and/or compounds in a gaseous substance. Such gas detectors are plagued by technical challenges and limitations. Through applied effort, ingenuity, and innovation, many of these identified problems have been solved by developing solutions that are included in embodiments of the present disclosure, many examples of which are described in detail herein.

BRIEF SUMMARY

Various embodiments described herein relate to methods, apparatuses, and systems for detecting a plurality of gaseous substances, such as, for example, a photoacoustic gas detecting apparatus.

In accordance with various examples of the present disclosure, a method for providing a sealed glass enclosure for a gas detecting apparatus is provided. The method may comprise: preparing a controller component that is operatively coupled to a sensing element, wherein the controller component comprises at least one electrical connector; joining a first glass component and a second glass component to form a unitary body such that the at least one electrical connector is disposed therebetween; preparing a glass tube comprising an open surface; disposing the controller component and sensing element within the glass tube; positioning the unitary body comprising the first glass component and the second glass component adjacent the open surface of the glass tube; and joining the unitary body to the glass tube to form the sealed glass enclosure. In some embodiments, the controller component is configured to: determine a concentration level of a target gaseous substance within the sealed glass enclosure based on a measurable acoustic signal detected via the sensing element; and generate a concentration level indication of the target gaseous sub stance.

In some embodiments, the controller component comprises a printed circuit board assembly (PCBA).

In some embodiments, the sensing element comprises a microphone.

In some embodiments, each of the first glass component and the second glass component comprises a substantially planar member.

In some embodiments, each of the first glass component, the second glass component, and the glass tube comprises borosilicate glass, soda lime glass, or fused silica.

In some embodiments, joining the first glass component and the second glass component to form the unitary body includes applying at least one of heat or mechanical pressure thereto.

In some embodiments, joining the unitary body to the glass tube to form the sealed glass enclosure includes welding or bonding the unitary body to the glass tube.

In some embodiments, the gas detecting apparatus comprises at least one of an infrared (IR) based detector or photoacoustic detector.

In some embodiments, the method further comprises subsequent to encapsulating the sealed glass enclosure, filling the sealed glass enclosure with a reference gaseous substance under specific gas atmosphere conditions.

In some embodiments, the sealed glass enclosure is filled via an evacuation port on a surface of the glass tube.

In some embodiments, the method further comprises, subsequent to filling the sealed glass enclosure with the reference gaseous substance, sealing the evacuation port using a melting, plugging, or gluing technique.

In accordance with some embodiments of the present disclosure, a gas detecting apparatus is provided. In some embodiments, the gas detecting apparatus comprises: a light source configured to generate a light beam; at least one optical component configured to condition an output light beam of the light source, wherein a measurable acoustic signal is generated responsive to exposing a sample gaseous substance to the conditioned output light beam; and a controller component in electronic communication with the at least one optical component that is configured to determine a concentration level of a target gaseous substance disposed within a sealed glass enclosure of the gas detecting apparatus based at least in part on the measurable acoustic signal, wherein the sealed glass enclosure is formed by: preparing the controller component, wherein the controller component is operatively coupled to a sensing element and comprises at least one electrical connector, joining a first glass component and a second glass component to form a unitary body such that the at least one electrical connector is disposed therebetween, preparing a glass tube comprising an open surface, disposing the controller component and sensing element within the glass tube, positioning the unitary body comprising the first glass component and the second glass component adjacent the open surface of the glass tube, and encapsulating the unitary body to the glass tube to form the sealed glass enclosure.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
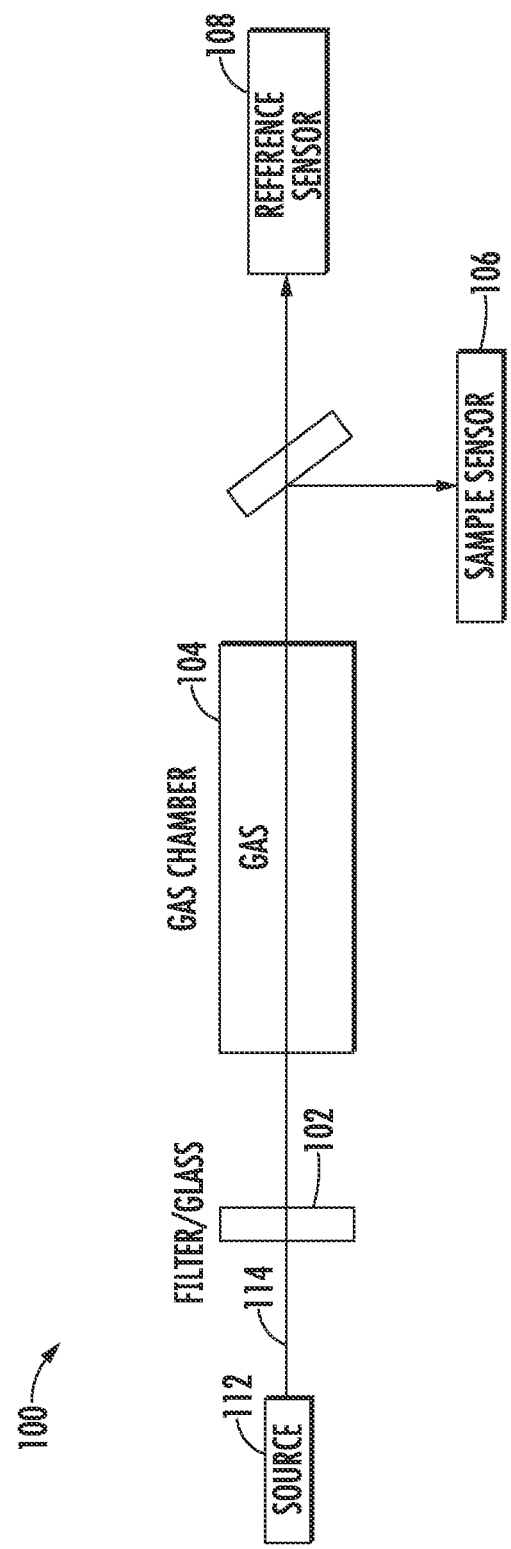
FIG. 1 illustrates an example schematic diagram depicting a gas detecting apparatus in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

The components illustrated in the figures represent components that may or may not be present in various embodiments of the present disclosure described herein such that embodiments may include fewer or more components than those shown in the figures while not departing from the scope of the present disclosure. Some components may be omitted from one or more figures or shown in dashed line for visibility of the underlying components.

The phrases "in an example embodiment," "some embodiments," "various embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such components or features may be optionally included in some embodiments, or may be excluded.

The terms "electronically coupled" or "in electronic communication with" in the present disclosure refers to two or more electrical elements (for example, but not limited to, an example processing circuitry, communication module, input/output module memory) and/or electric circuit(s) being connected through wired means (for example but not limited to, conductive wires or traces) and/or wireless means (for example but not limited to, wireless network, electromagnetic field), such that data and/or information (for example, electronic indications, signals) may be transmitted to and/or received from the electrical elements and/or electric circuit(s) that are electronically coupled.

The terms "electromagnetic radiation," "radiation," or "radiant energy" are used herein to refer to various kinds of electromagnetic radiant energy that exhibits properties of waves and particles including visible light, radio waves, microwaves, infrared (IR), ultraviolet (UV), X-rays and gamma rays. The electromagnetic spectrum comprises a range of all known types of electromagnetic radiation, including electromagnetic radiation that cannot be detected by the human eye. Various portions of the electromagnetic spectrum are associated with electromagnetic radiation that has certain characteristics (e.g., certain wavelengths and frequencies). For example, visible light emits electromagnetic radiation with wavelengths ranging between 380 and 750 nanometers (nm). In contrast, IR electromagnetic radiation may comprise wavelengths ranging between 0.7 and 5 microns.

The terms "photoacoustic detector" or "gas detecting apparatus" are used herein to refer to a device that is configured to measure an effect of absorbed radiant energy (e.g., infrared radiation) on matter (e.g., molecules) by means of acoustic detection. The absorbed radiant energy may generate heat and thermal expansion, which in turn creates sound/pressure waves that can be detected as a measurable acoustic signal by a sensing element, such as a microphone.

The terms "gas enclosure," "glass enclosure," "gas cell," and "gas chamber" are used interchangeably herein to refer to a sealed container of a gas detecting apparatus that is configured to receive a reference and/or sample gaseous substance.

Various apparatuses (such as, but not limited to, an infrared gas detector or fixed gas detector) may detect a presence of and/or measure a concentration level of a target gaseous substance, chemical composition, molecules, vapor, and/or the like. For example, optical measurement is based on the tendency of molecules in a gaseous substance, when exposed to certain wavelengths of radiant energy (e.g., infrared radiation), to absorb the energy and reach higher levels of molecular vibration and rotation. For example, infrared radiation may cause resonance of molecules in a gaseous substance at their natural frequency within a spectrum region where the radiant energy of the infrared radiation is equivalent to the natural frequency of the molecules resulting in energy absorption in the form of molecular vibration. An example gas detector may, via one or more sensing elements, detect a decrease in transmitted radiant energy (e.g., infrared radiation) that is proportional to a concentration value/amount of the sample gaseous sub stance.

Referring now to FIG. 1, a schematic diagram depicting an example gas detecting apparatus 100 in accordance with various embodiments of the present disclosure is provided.

In particular, as shown, the example gas detecting apparatus 100 comprises a filter glass 102, where radiant energy provided by a source 112 (e.g., IR or radiant source) may pass through the filter glass 102 before entering a gas chamber 104 (e.g., gas cell, gas tube, and/or the like). In some embodiments, the filter glass 102 may be located at any point in the path between the source 112 and the one or more sensing elements (e.g., sample sensor 106 and reference sensor 108). In some embodiments, the material of the filter glass 102 may be chosen to filter specific wavelengths of radiant energy or light. The materials that may be used in the filter glass 102 may contain hydroxyls in their molecular structure, for example, fused silica. In some embodiments, the filter glass 102 may comprise borosilicate or crown glass.

In various embodiments, the source 112 is positioned to emit (e.g., transmit) radiant energy (e.g., infrared radiation) into the gas chamber 104 such that a gaseous substance disposed within the gas chamber 104 absorbs at least a portion of the transmitted radiant energy. In some embodiments, the remaining (e.g., unabsorbed) transmitted radiant energy may then travel (e.g., pass through, traverse) to the one or more sensing elements (e.g., sample sensor 106 and reference sensor 108). In various embodiments, the absorption of radiant energy generates heat/thermal expansion which in turn generates pressure and/or sound waves that can be detected via one or more sensing elements (e.g., sample sensor 106 and reference sensor 108).

In various embodiments, the source 112 serves to provide radiant energy within the infrared spectrum to the gas chamber 104. Any suitable source of IR radiation can be used for the source 112 (e.g., radiation or IR source), and the source 112 may comprise or be operatively coupled to focusing elements (e.g., lenses). In some embodiment, the source 112 can comprise one or more IR lamps, light emitting diodes (LEDs), and the like. An integrated power supply may be coupled to the source 112. For example, a 50 to 500 kHz power supply can be used to power the source 112 to initiate and maintain the discharge of IR radiation.

At least a portion of the radiant energy/radiation provided by the source 112 may be emitted into the gas chamber 104 or one or more windows can be used to allow the radiation to enter/pass into the gas chamber 104 where it can be absorbed by a gas substance (e.g., sample gaseous substance) disposed therein. In some examples, the filter glass 102, or other kind of spectral filter, can be used to filter IR radiation and allow a desired portion of the IR spectrum to pass through to the one or more sensing elements (e.g., sample sensor 106 and reference sensor 108). The one or more sensing elements (e.g., sample sensor 106 and reference sensor 108) can comprise any sensor sensitive to IR radiation in the absorption band of the target gaseous substance. In some embodiments, the sample sensor 106 and the reference sensor 108 may comprise thermal detectors (thermocouples, thermopiles, pneumatic cells, or the like).

In various embodiments, photoacoustic detectors may comprise a gas chamber or gas cell comprising a sealed container that is transparent to light and configured to receive a sample gaseous substance. For example, a gaseous substance disposed within the example gas chamber or gas cell may absorb a particular wavelength of radiant energy which in turn results in an internal pressure change that is correlated to an amount of radiant energy at a specific wavelength generated by the photoacoustic detector. In an instance in which the radiant energy is modulated, a resulting pressure change may generate sound waves that can be detected or captured by a sensing element that may be attached to an external surface of the photoacoustic detector, such as a microphone. In various examples, production of such photoacoustic detectors is technically challenging and expensive due to the requirement that the gas chamber/gas cell is both gas tight and transparent. As noted above, a sensing element (e.g., microphone) may be positioned outside the gas chamber such that providing and sealing electrical connections to the sense element/microphone may prove technically complex and challenging.

To address challenges and limitations associated with manufacturing such detectors, various examples of the present disclosure may be provided. In some examples, simple, durable, and reliable techniques for providing/manufacturing gas chambers (e.g., gas cells) are provided herein. The operational life of apparatuses that are made using the note techniques may be greatly increased in comparison with known devices and the use of existing techniques. For example, a controller component/sensing element may be integrated into (e.g., disposed within) an example gas chamber enhancing the accuracy of measurements obtained therefrom, extending the life of such apparatuses. Moreover, the disclosed sealing techniques may enhance imperviousness and thus provide an improved air-tight gas chamber which will not be penetrated by various chemicals and elements in the environment. Further, embodiments of the present disclosure are easy and inexpensive to implement.

In accordance with various embodiments of the present disclosure, example methods, apparatuses, and systems are provided. In some embodiments, a method for providing a sealed glass enclosure for a gas detecting apparatus is provided. The method may comprise: preparing a controller component that is operatively coupled to a sensing element, wherein the controller component comprises at least one electrical connector; joining a first glass component and a second glass component to form a unitary body such that the at least one electrical connector is disposed therebetween; preparing a glass tube comprising an open surface; disposing the controller component and sensing element within the glass tube; positioning the unitary body comprising the first glass component and the second glass component adjacent the open surface of the glass tube; and joining the unitary body to the glass tube to form the sealed glass enclosure. In some examples, the controller component is configured to: determine a concentration level of a target gaseous substance within the sealed glass enclosure based on a measurable acoustic signal detected via the sensing element; and generate a concentration level indication of the target gaseous substance. In some examples, the controller component comprises a PCBA. In some examples, the sensing element comprises a microphone. In some examples, each of the first glass component and the second glass component comprises a substantially planar member. In some examples, each of the first glass component, the second glass component, and the glass tube comprises borosilicate glass, soda lime glass, or fused silica. In some examples, joining the first glass component and the second glass component to form the unitary body includes applying at least one of heat or mechanical pressure thereto. In some examples, joining the unitary body to the glass tube to form the sealed glass enclosure includes welding or bonding the unitary body to the glass tube. In some examples, the gas detecting apparatus comprises at least one of an IR based detector or photoacoustic detector. In some examples, the method further comprises subsequent to encapsulating the sealed glass enclosure, filling the sealed glass enclosure with a reference gaseous substance under specific gas atmosphere conditions. In some examples, the sealed glass enclosure is filled via an evacuation port on a surface of the glass tube. In some examples, the method further comprises: subsequent to filling the sealed glass enclosure with the reference gaseous substance, sealing the evacuation port using a melting, plugging, or gluing technique.

In accordance with some embodiments of the present disclosure, a gas detecting apparatus is provided. In some examples, the gas detecting apparatus comprises a light source configured to generate a light beam; at least one optical component configured to condition an output light beam of the light source, wherein a measurable acoustic signal is generated responsive to exposing a sample gaseous substance to the conditioned output light beam; and a controller component in electronic communication with the at least one optical component that is configured to determine a concentration level of a target gaseous substance disposed within a sealed glass enclosure of the gas detecting apparatus based at least in part on the measurable acoustic signal, wherein the sealed glass enclosure is formed by: preparing the controller component, wherein the controller component is operatively coupled to a sensing element and comprises at least one electrical connector; joining a first glass component and a second glass component to form a unitary body such that the at least one electrical connector is disposed therebetween, preparing a glass tube comprising an open surface, disposing the controller component and sensing element within the glass tube, positioning the unitary body comprising the first glass component and the second glass component adjacent the open surface of the glass tube, and encapsulating the unitary body to the glass tube to form the sealed glass enclosure. In some examples, the controller component comprises a PCBA. In some examples, the sensing element comprises a microphone. In some examples, each of the first glass component and the second glass component comprises a substantially planar member. In some examples, each of the first glass component, the second glass component, and the glass tube comprises borosilicate glass, soda lime glass, or fused silica. In some examples, joining the first glass component and the second glass component to form the unitary body includes applying at least one of heat or mechanical pressure thereto. In some examples, joining the unitary body to the glass tube to form the sealed glass enclosure includes welding or bonding the unitary body to the glass tube. In some examples, the gas detecting apparatus comprises at least one of an IR based detector or photoacoustic detector.

Figure 2:
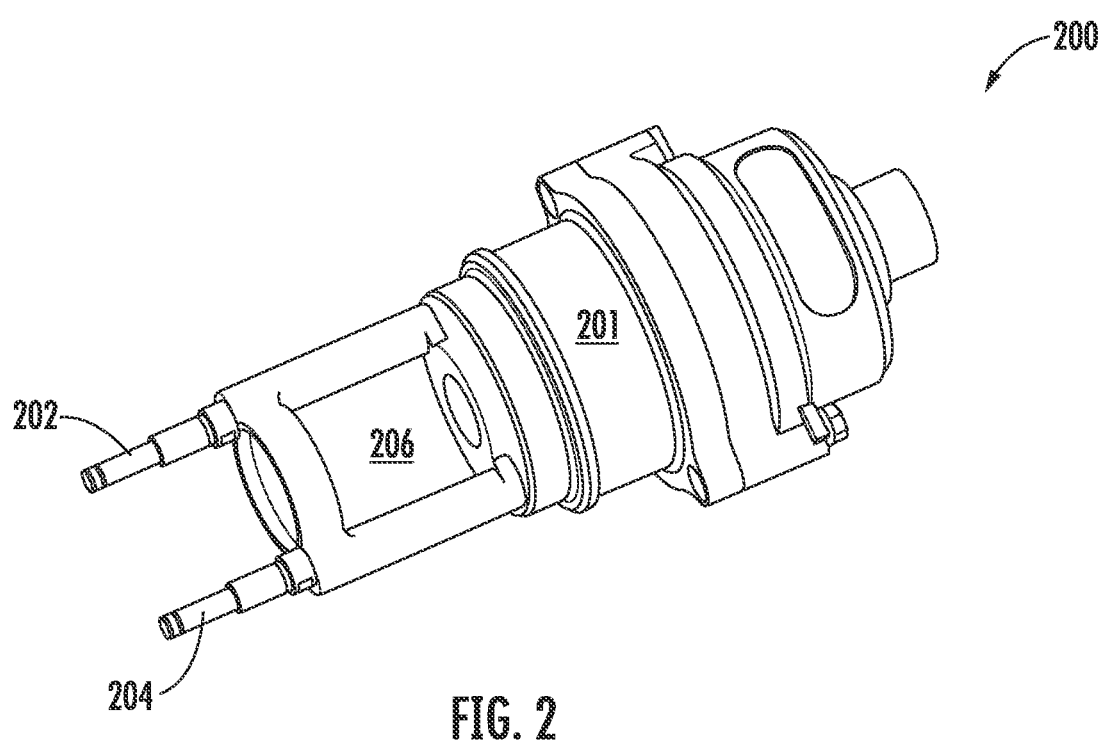
FIG. 2 illustrates another example schematic diagram depicting a gas detecting apparatus in accordance with various embodiments of the present disclosure.

Referring now to FIG. 2, a schematic diagram depicting an example gas detecting apparatus 200 in accordance with various embodiments of the present disclosure is provided. The example gas detecting apparatus may be or comprise an infrared gas detector, an infrared point hydrocarbon gas detector, or the like. In various embodiments, the example gas detecting apparatus 200 is configured to determine a concentration level of a sample gaseous substance by sensing absorption of infrared radiation/light at specific wavelengths. By way of example, the gas detecting apparatus 200 may be configured to provide a light beam in order to facilitate providing measurements associated a sample gaseous substance.

As illustrated in FIG. 2, the gas detecting apparatus 200 comprises a substantially tubular or cylindrically shaped member that is configured to convey a flowing media (e.g., sample gaseous substance) from an inlet 202 of the gas detecting apparatus 200, into a portion, path, passageway, chamber, and/or the like. In particular, as depicted, a flowing media may enter a gas enclosure 206 (e.g., gas chamber, or gas cell) of the gas detecting apparatus 200, and subsequently exit the gas detecting apparatus 200 via an outlet 204 of the gas detecting apparatus. In various embodiments, an example housing 201 of the gas detecting apparatus may be or comprise metal, plastic, combinations thereof, and/or the like. As noted above, a measurable acoustic signal may be generated in response to exposing a gaseous substance to the conditioned beam of a particular bandwidth. In various examples, the gas detecting apparatus 200 comprises a sensing element/detecting element that is configured to provide measurements associated with a gaseous substance. An example sensing element may be or comprise a microphone that is configured to detect an acoustic signal corresponding with a concentration level of a target gaseous substance.

Figure 3A:
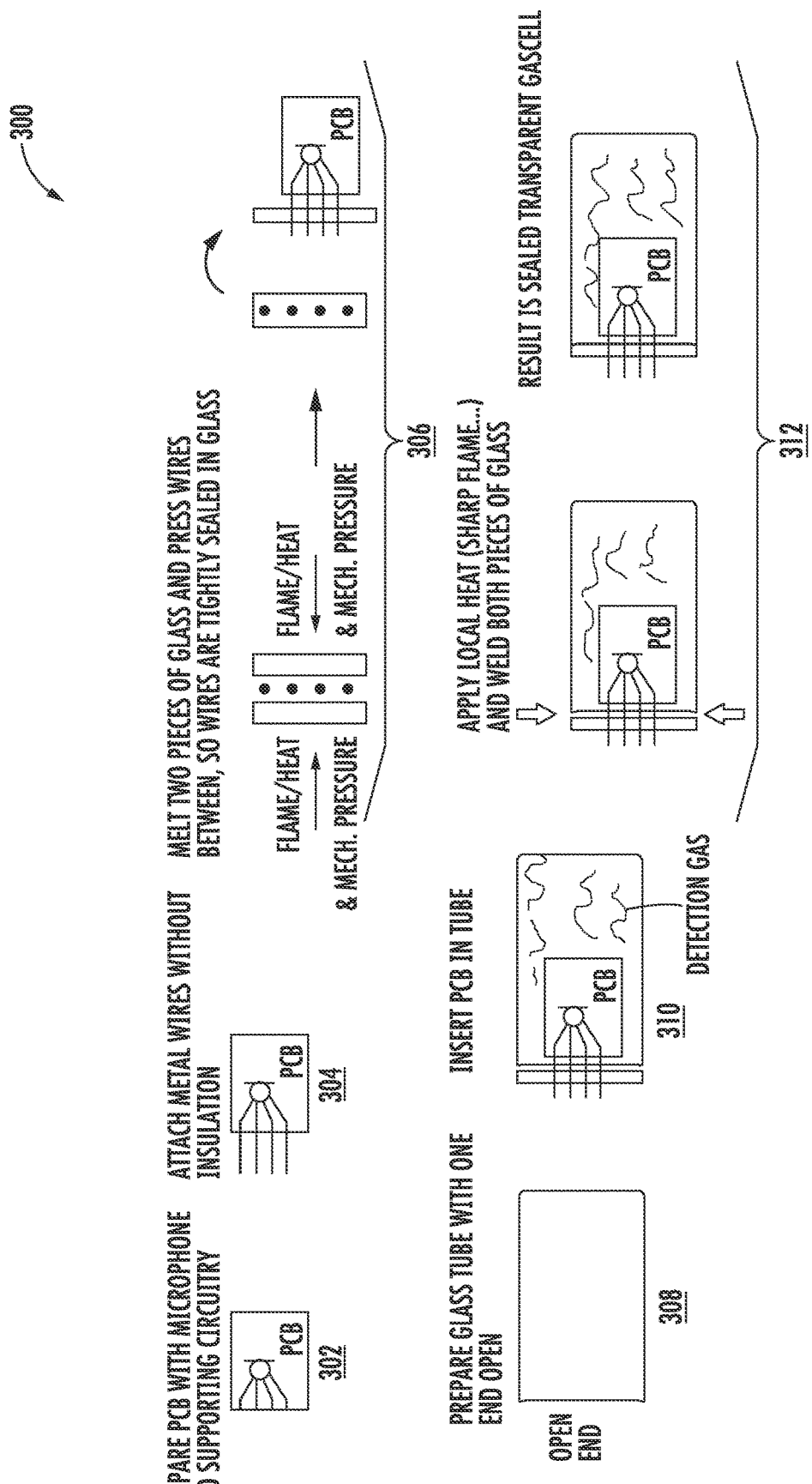
FIG. 3A illustrates an operational example depicting a method in accordance with various embodiments of the present disclosure.

Referring now to FIG. 3A, a schematic diagram depicting an operational example of a method 300 for providing (e.g., manufacturing, assembling, and/or the like) a gas detecting apparatus in accordance with various embodiments of the present disclosure is provided. In various examples, the example gas detecting apparatus (e.g., fixed gas detecting apparatus) may be configured to provide measurements associated with one or more target gaseous substances, chemical compositions, molecules, and/or the like. Accordingly, it should be understood that in some examples, the gas detecting apparatus may be configured to detect gaseous substances and/or chemical compositions (e.g., without limitation, liquid substances, vapors, transparent solid substances, semi-transparent solid substances, and/or the like).

As depicted in FIG. 3A, the example method 300 begins at step/operation 302. At step/operation 302, the method 300 comprises preparing a controller component and supporting circuitry. The example controller component may be or comprise a PCBA. In some embodiments, the controller component/PCBA may be or comprise epoxy, ceramic, alumina, Liquid Crystal Polymers (LCPs), combinations thereof, and/or the like. In some embodiments, step/operation 302 comprises soldering electrical elements (e.g., resistors, capacitors, and/or the like) to a substrate to form the controller component. The example controller component (e.g., PCBA) may comprise a thick film printed ceramic board, a laminate, and/or other material. The example controller component (e.g., PCBA) may include one or more conductive pads for engaging circuitry and/or electronic components in communication with a remote processor or the like.

Subsequent to step/operation 302, the method 300 proceeds to step/operation 304. At step/operation 304, the method comprises attaching electrical connectors (e.g., metal wires, copper wires, and/or the like) to the controller component (e.g., PCBA). In some examples, one or more metal wires may be attached (e.g., without insulation). In some embodiments, one or more electrical connectors (e.g., metal wires) may be attached to facilitate providing/forming an electrical/electronic connection with a sensing element or remote controller using various techniques. In some embodiments, the controller component may comprise at least one sensing element. In some embodiments, wire bonds, bump bonds or the like may be utilized to electrically connect an example sensing element to the controller component (e.g., PCBA). In some embodiments, the example sensing element comprises a membrane configured to detect a pressure difference between a top surface and bottom surface of the membrane. In some examples, the method 300 may not include attaching electrical connectors to the controller component. For example, a controller component/PCBA with pre-attached electrical connectors and/or wires may be provided.

Subsequent to step/operation 304, the example method 300 proceeds to step/operation 306. At step/operation 306, the method 300 comprises joining (e.g., melting) two glass components (e.g., pieces, parts, portions, and/or the like). In some examples, step/operation 306 comprises pressing electrical connectors (e.g., metal wires) between two glass components in order to seal the electrical connectors (e.g., metal wires) therebetween and form a unitary body. As depicted, the electrical connectors (e.g., metal wires) may be connected to the controller component/PCBA. In some embodiments, each glass component may comprise a substantially planar member or sheet. In some embodiments, the glass components may be or comprise borosilicate glass, soda lime glass, fused silica, and/or the like. In various examples, the glass components may be selected based on a target gas absorption frequency range (e.g., borosilicate glass may be selected for an IR electromagnetic spectrum). In some embodiments, step/operation 304 may include applying mechanical force/pressure, heat (e.g., flames), combinations thereof, and/or the like to seal the electrical connectors (e.g., wires) between the glass components.

Subsequent to step/operation 306, the example method 300 proceeds to step/operation 308. At step/operation 308, the method 300 comprises preparing a glass tube (e.g., gas cell) with one open or exposed end (e.g., surface, side, or the like). The example glass tube (e.g., gas cell) may comprise or define a cavity. In some embodiments, the glass tube may comprise a similar or identical material to the two glass components used in step/operation 304. For example, the glass tube may comprise borosilicate glass, soda lime glass, fused silica, and/or the like. In some embodiments, the glass tube may comprise a different material from the glass components.

Subsequent to step/operation 308, the method 300 proceeds to step/operation 310. At step/operation 310, the method 300 comprises inserting (e.g., placing, disposing, or the like) the prepared controller component (e.g., PCBA/electrical connectors) within the glass tube (e.g., gas cell) along with a reference gaseous substance (e.g., detecting gas, or the like). In some examples, the reference gaseous substance may be manually injected into the glass tube. In some embodiments, step/operation 310 may be performed under specific gas atmosphere conditions. In some examples, the glass tube/gas cell and controller component (e.g., PCBA/electrical connectors) may be assembled in a sealed enclosure and/or as part of a machine assembly line. In some embodiments, the glass tube/gas cell may be filled with a specific gas (e.g., Hydrocarbons (such as Methane, Ethylene, Butane), Carbon Dioxide, a Nitrous Oxide, combinations thereof, and/or the like) prior to assembly.

Subsequent to step/operation 310, the method 300 proceeds to step/operation 312. At step/operation 312, the method 300 comprises encapsulating (e.g., connecting, joining, bonding, welding, and/or the like) the glass tube and the glass components to form the sealed glass chamber with the controller component (e.g., PCBA) and the reference gaseous substance (e.g., detection gas) disposed therein. In some examples, encapsulating/connecting the glass tube and the glass components comprises applying local heat (e.g., flames) to weld the glass tube and the glass components together to provide a sealed transparent gas chamber or gas cell. As depicted in FIG. 2, at least a portion of the electrical connectors may be disposed outside the encapsulated glass chamber, providing a connection point or means for other elements/circuitry to be connected thereto.

Figure 3B:
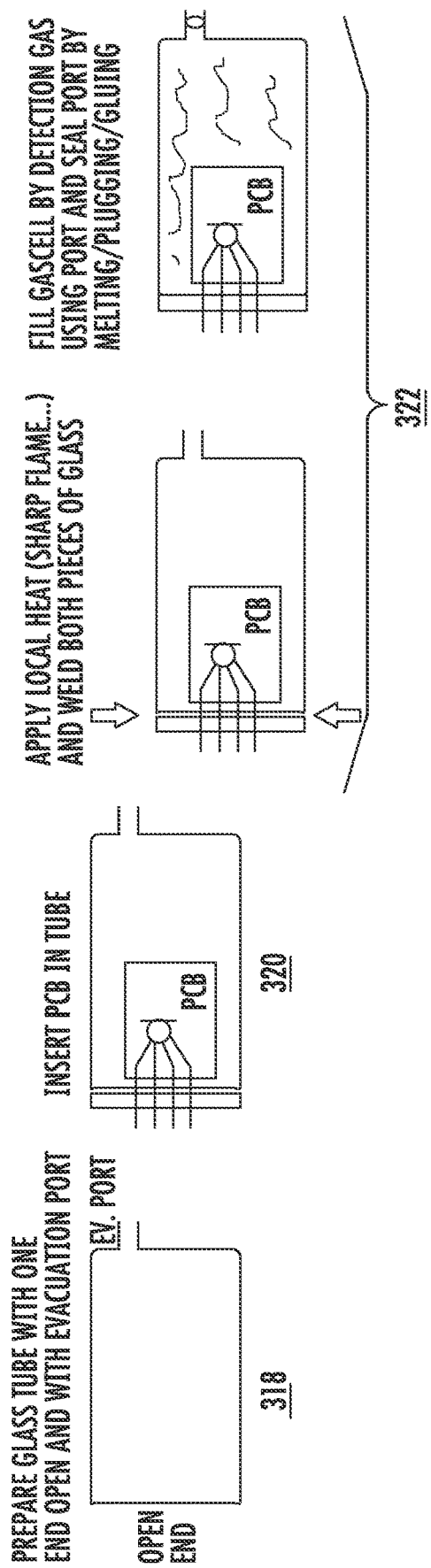
FIG. 3B illustrates another operational example depicting a method in accordance with various embodiments of the present disclosure.

Referring now to FIG. 3B, another schematic diagram depicting an operational example of a method 301 for providing (e.g., manufacturing, assembling, and/or the like) a gas detecting apparatus in accordance with various embodiments of the present disclosure is provided. In particular, FIG. 3B depicts an alternate example for performing step/operation 308, step/operation 310, and step/operation 312 in FIG. 3A.

At step/operation 318 (subsequent to performing step/operation 302, step/operation 304, and step/operation 306 in FIG. 3A), the method 301 comprises preparing a glass tube (e.g., gas cell) with one open or exposed end (e.g., surface, side, or the like). As further depicted, the example glass tube comprises an evacuation port. The evacuation port may be or comprise an aperture on a surface of the glass tube (e.g., opposite the open surface). The example glass tube (e.g., gas cell) may comprise or define a cavity that is configured to receive/house electrical components and/or a gaseous substance. In some embodiments, the glass tube may comprise a similar or identical material to the two glass components used in step/operation 304. For example, the glass tube may comprise borosilicate glass, soda lime glass, fused silica, and/or the like. In some embodiments, the glass tube may comprise a different material from the glass components.

Subsequent to step/operation 318, the method 301 proceeds to step/operation 320. At step/operation 320, the method 301 comprise inserting (e.g., placing, disposing, or the like) the prepared controller component (e.g., PCBA/electrical connectors) within the glass tube. In various embodiments, step/operation 320 may be performed under specific gas atmosphere conditions.

Subsequent to step/operation 320, the method 301 proceeds to step/operation 322. At step/operation 322, the method 301 comprises connecting (e.g., joining, bonding, welding, and/or the like) the glass tube and the glass components to form the sealed glass tube/gas cell with the controller component (e.g., PCBA) disposed therein. In some examples, connecting the glass tube and the glass components comprises applying local heat (e.g., flames) to weld the glass tube and the glass components together to provide a sealed transparent gas cell. As depicted, at least a portion of the electrical connectors may be disposed outside the glass tube/gas cell, providing a connection point or means for other elements/circuitry to be connected thereto.

Subsequent to step/operation 320, the method 301 proceeds to step/operation 322. At step/operation 322, the method 301 comprises filling (e.g., injecting, providing) a gaseous substance (e.g., reference detection gas) into the sealed glass tube/gas cell via the evacuation port (e.g., using vacuum tubing technology). In some examples, the evacuation port may be connected to a pipe (e.g., glass pipe) that is in turn connected to a vacuum pump/source. In some embodiments, the evacuation port may be used to remove (e.g., extract, expel, or the like) air from the glass tube/gas cell. In some examples, subsequent to removing air from the glass tube/gas cell, step/operation 322 may comprise filling the glass tube/gas cell with the reference detection gas. Air may be iteratively removed and replaced with a gaseous substance/reference detection gas until a target amount, concentration, and/or purity of the gaseous substance/reference detection gas within the glass tube/gas cell is reached. Once the target amount, concentration and/or purity of the gaseous substance/reference detection gas is reached, the evacuation port may be sealed (e.g., melted). In some examples, the evacuation port may be sealed using a sealing element and/or using various techniques (e.g., melting, plugging, gluing, and/or the like). In various embodiments, step/operation 322 may be performed under specific gas atmosphere conditions.

While FIG. 3A and FIG. 3B provide example methods 300 and 301, it is noted that the scope of the present disclosure is not limited to the examples shown in FIG. 3A and FIG. 3B. In some examples, a method for providing an example gas detecting apparatus may include additional steps/operations, and an example gas detecting apparatus may comprise additional and/or alternative elements which may be structured/positioned differently.

Figure 4:
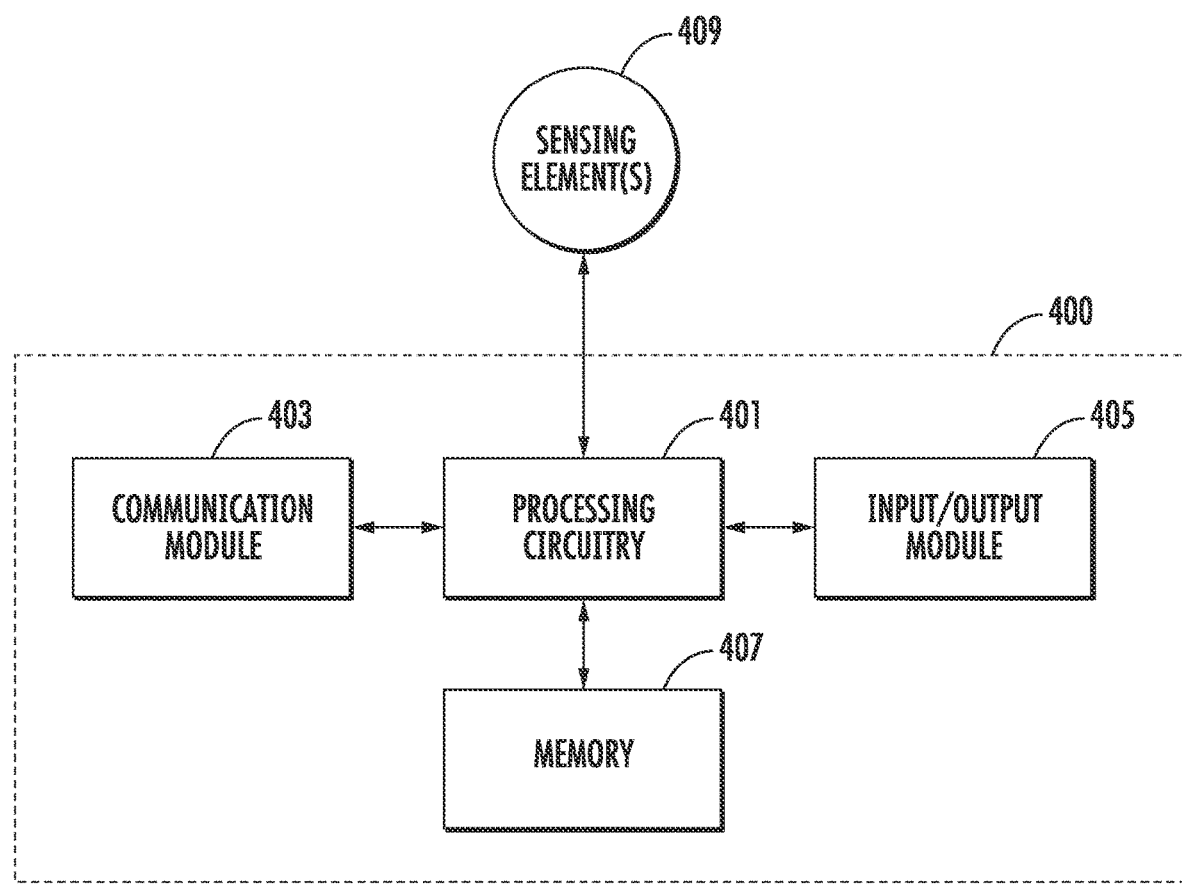
FIG. 4 illustrates an example controller component in electronic communication with various other components of an example apparatus in accordance with various embodiments of the present disclosure.

Referring now to FIG. 4, a schematic diagram depicting an example controller component 400 (e.g., PCBA) of an example apparatus in electronic communication with various other components in accordance with various embodiments of the present disclosure. As shown, the controller component 400 comprises processing circuitry 401, a communication module 403, input/output module 405, a memory 407 and/or other components configured to perform various operations, procedures, functions or the like described herein.

As shown, the controller component 400 (such as the processing circuitry 401, communication module 403, input/output module 405 and memory 407) is electrically coupled to and/or in electronic communication with sensing element 409 of a gas detecting apparatus (e.g., photoacoustic gas detecting apparatus). As depicted, the sensing element 409 may exchange (e.g., transmit and receive) data with the processing circuitry 401 of the controller component 400.

The processing circuitry 401 may be implemented as, for example, various devices comprising one or a plurality of microprocessors with accompanying digital signal processors; one or a plurality of processors without accompanying digital signal processors; one or a plurality of coprocessors; one or a plurality of multi-core processors; one or a plurality of controllers; processing circuits; one or a plurality of computers; and various other processing elements (including integrated circuits, such as ASICs or FPGAs, or a certain combination thereof). In some embodiments, the processing circuitry 401 may comprise one or more processors. In one exemplary embodiment, the processing circuitry 401 is configured to execute instructions stored in the memory 407 or otherwise accessible by the processing circuitry 401. When executed by the processing circuitry 401, these instructions may enable the controller component 400 to execute one or a plurality of the functions as described herein. No matter whether it is configured by hardware, firmware/software methods, or a combination thereof, the processing circuitry 401 may comprise entities capable of executing operations according to the embodiments of the present invention when correspondingly configured. Therefore, for example, when the processing circuitry 401 is implemented as an ASIC, an FPGA, or the like, the processing circuitry 401 may comprise specially configured hardware for implementing one or a plurality of operations described herein. Alternatively, as another example, when the processing circuitry 401 is implemented as an actuator of instructions (such as those that may be stored in the memory 407), the instructions may specifically configure the processing circuitry 401 to execute one or a plurality of algorithms and operations described herein, such as those discussed with reference to FIG. 5.

The memory 407 may comprise, for example, a volatile memory, a non-volatile memory, or a certain combination thereof. Although illustrated as a single memory in FIG. 4, the memory 407 may comprise a plurality of memory components. In various embodiments, the memory 407 may comprise, for example, a hard disk drive, a random access memory, a cache memory, a flash memory, a Compact Disc Read-Only Memory (CD-ROM), a Digital Versatile Disk Read-Only Memory (DVD-ROM), an optical disk, a circuit configured to store information, or a certain combination thereof. The memory 407 may be configured to store information, data, application programs, instructions, and etc., so that the controller component 400 can execute various functions according to the embodiments of the present disclosure. For example, in at least some embodiments, the memory 407 is configured to cache input data for processing by the processing circuitry 401. Additionally or alternatively, in at least some embodiments, the memory 407 is configured to store program instructions for execution by the processing circuitry 401. The memory 407 may store information in the form of static and/or dynamic information. When the functions are executed, the stored information may be stored and/or used by the controller component 400.

The communication module 403 may be implemented as any apparatus included in a circuit, hardware, a computer program product or a combination thereof, which is configured to receive and/or transmit data from/to another component or apparatus. The computer program product comprises computer-readable program instructions stored on a computer-readable medium (for example, the memory 407) and executed by a controller component 400 (for example, the processing circuitry 401). In some embodiments, the communication module 403 (as with other components discussed herein) may be at least partially implemented as the processing circuitry 401 or otherwise controlled by the processing circuitry 401. In this regard, the communication module 403 may communicate with the processing circuitry 401, for example, through a bus. The communication module 403 may comprise, for example, antennas, transmitters, receivers, transceivers, network interface cards and/or supporting hardware and/or firmware/software, and is used for establishing communication with another apparatus. The communication module 403 may be configured to receive and/or transmit any data that may be stored by the memory 407 by using any protocol that can be used for communication between apparatuses. The communication module 403 may additionally or alternatively communicate with the memory 407, the input/output module 405 and/or any other component of the controller component 400, for example, through a bus.

In some embodiments, the controller component 400 may comprise an input/output module 405. The input/output module 405 may communicate with the processing circuitry 401 to receive instructions input by the user and/or to provide audible, visual, mechanical or other outputs to the user. Therefore, the input/output module 405 may comprise supporting devices, such as a keyboard, a mouse, a display, a touch screen display, and/or other input/output mechanisms. Alternatively, at least some aspects of the input/output module 405 may be implemented on a device used by the user to communicate with the controller component 400. The input/output module 405 may communicate with the memory 407, the communication module 403 and/or any other component, for example, through a bus. One or a plurality of input/output modules and/or other components may be included in the controller component 400. For example, sensing element 409 may provide a measurable acoustic signal for generating a concentration level indication associated with at least one target gaseous substance by the processing circuitry 401.

Figure 5:
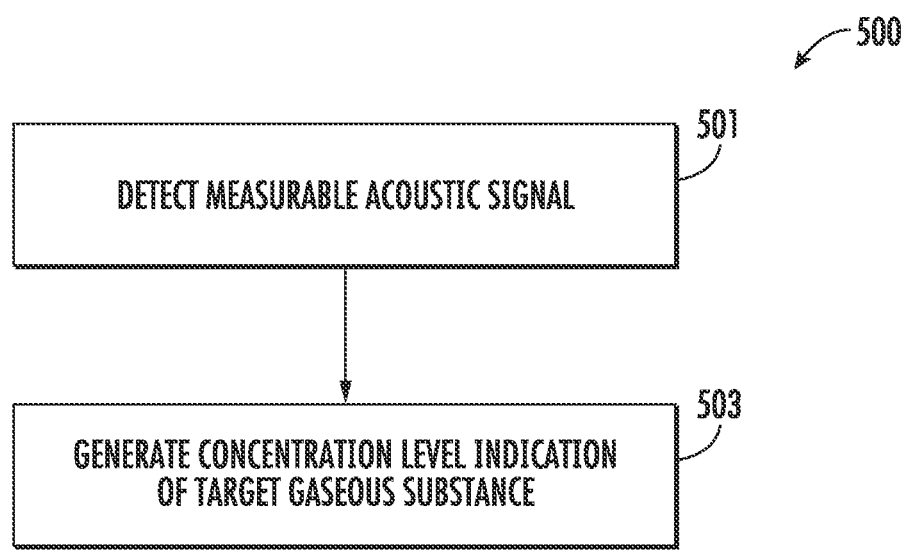
FIG. 5 is a flowchart diagram illustrating example operations in accordance with various embodiments of the present disclosure.

Referring now to FIG. 5, a flowchart diagram illustrating an example method 500 in accordance with various embodiments of the present disclosure is provided.

In some examples, the method 500 may be performed by a processing circuitry (for example, but not limited to, an application-specific integrated circuit (ASIC), a central processing unit (CPU)). In some examples, the processing circuitry may be electrically coupled to and/or in electronic communication with other circuitries of the example apparatus, such as, but not limited to, a sensing element, a memory (such as, for example, random access memory (RAM) for storing computer program instructions), and/or a display circuitry (for rendering readings on a display).

In some examples, one or more of the procedures described in FIG. 5 may be embodied by computer program instructions, which may be stored by a memory (such as a non-transitory memory) of a system employing an embodiment of the present disclosure and executed by a processing circuitry (such as a processor) of the system. These computer program instructions may direct the system to function in a particular manner, such that the instructions stored in the memory circuitry produce an article of manufacture, the execution of which implements the function specified in the flow diagram step/operation(s). Further, the system may comprise one or more other circuitries. Various circuitries of the system may be electronically coupled between and/or among each other to transmit and/or receive energy, data and/or information.

In some examples, embodiments may take the form of a computer program product on a non-transitory computer-readable storage medium storing computer-readable program instruction (e.g., computer software). Any suitable computer-readable storage medium may be utilized, including non-transitory hard disks, CD-ROMs, flash memory, optical storage devices, or magnetic storage devices.

The example method 500 begins at step/operation 501. At step/operation 501, a processing circuitry (such as, but not limited to, the processing circuitry 401 of the controller component 400 illustrated in connection with FIG. 4, discussed above) receives an indication describing a measurable acoustic signal (e.g., detected via a sensing element, such as but not limited to, sensing element 409 described above in connection with FIG. 4. For example, the processing circuitry 401 may receive an indication associated with a light beam/gas absorbance frequency range or value detected by the example sensing element.

Subsequent to step/operation 501, the example method 500 proceeds to step/operation 503. At step/operation 503, the processing circuitry generates a concentration level indication of a target gaseous substance (e.g., utilizing a lookup table to identify stored parameters associated with a detected measurable acoustic signal. In some embodiments, step/operation 503 may include generating an alert (e.g., message) corresponding with the concentration level indication (e.g., via a display). For example, processing circuitry may transmit a control indication to generate an alert (e.g., via a display of the example gas detecting apparatus).

Using the techniques disclosed herein, an improved transparent, gas tight chamber for a gas detecting apparatus may be provided. As described herein, a controller component and/or sensing element may be disposed within the gas chamber in order to simplify manufacturing processes and improve the accuracy of measurements obtained using the sensing element/controller component.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method for providing a sealed glass enclosure for a gas detecting apparatus, the method comprising:
   preparing a controller component that is operatively coupled to a sensing element, wherein the controller component comprises at least one electrical connector;
   joining a first glass component and a second glass component to form a unitary body such that the at least one electrical connector is disposed therebetween;
   preparing a glass tube comprising an open surface;
   disposing the controller component and sensing element within the glass tube;
   positioning the unitary body comprising the first glass component and the second glass component adjacent the open surface of the glass tube; and
   encapsulating the unitary body to the glass tube to form the sealed glass enclosure.

2. The method of claim 1, wherein the controller component is configured to:
   determine a concentration level of a target gaseous substance within the sealed glass enclosure based on a measurable acoustic signal detected via the sensing element; and
   generate a concentration level indication of the target gaseous substance.

3. The method of claim 1, wherein the controller component comprises a printed circuit board assembly (PCBA).

4. The method of claim 1, wherein the sensing element comprises a microphone.

5. The method of claim 1, wherein each of the first glass component and the second glass component comprises a substantially planar member.

6. The method of claim 1, wherein each of the first glass component, the second glass component, and the glass tube comprises borosilicate glass, soda lime glass, or fused silica.

7. The method of claim 1, wherein joining the first glass component and the second glass component to form the unitary body includes applying at least one of heat or mechanical pressure thereto.

8. The method of claim 1, wherein joining the unitary body to the glass tube to form the sealed glass enclosure includes welding or bonding the unitary body to the glass tube.

9. The method of claim 1, wherein the gas detecting apparatus comprises at least one of an infrared (IR) based detector or photoacoustic detector.

10. The method of claim 1, further comprising:
    subsequent to encapsulating the sealed glass enclosure, filling the sealed glass enclosure with a reference gaseous substance.

11. The method of claim 10, wherein the sealed glass enclosure is filled via an evacuation port on a surface of the glass tube.

12. The method of claim 11, further comprising:
    subsequent to filling the sealed glass enclosure with the reference gaseous substance, sealing the evacuation port using a melting, plugging, or gluing technique.

13. A gas detecting apparatus comprising:
    a light source configured to generate a light beam;
    at least one optical component configured to condition an output light beam of the light source, wherein a measurable acoustic signal is generated responsive to exposing a sample gaseous substance to the conditioned output light beam; and
    a controller component in electronic communication with the at least one optical component that is configured to determine a concentration level of a target gaseous substance disposed within a sealed glass enclosure of the gas detecting apparatus based at least in part on the measurable acoustic signal, wherein the sealed glass enclosure is formed by:
       preparing the controller component, wherein the controller component is operatively coupled to a sensing element and comprises at least one electrical connector, joining a first glass component and a second glass component to form a unitary body such that the at least one electrical connector is disposed therebetween, preparing a glass tube comprising an open surface, disposing the controller component and sensing element within the glass tube, positioning the unitary body comprising the first glass component and the second glass component adjacent the open surface of the glass tube, and encapsulating the unitary body to the glass tube to form the sealed glass enclosure.

14. The gas detecting apparatus of claim 13, wherein the controller component comprises a printed circuit board assembly (PCBA).

15. The gas detecting apparatus of claim 13, wherein the sensing element comprises a microphone.

16. The gas detecting apparatus of claim 13, wherein each of the first glass component and the second glass component comprises a substantially planar member.

17. The gas detecting apparatus of claim 13, wherein each of the first glass component, the second glass component, and the glass tube comprises borosilicate glass, soda lime glass, or fused silica.

18. The gas detecting apparatus of claim 13, wherein joining the first glass component and the second glass component to form the unitary body includes applying at least one of heat or mechanical pressure thereto.

19. The gas detecting apparatus of claim 13, wherein joining the unitary body to the glass tube to form the sealed glass enclosure includes welding or bonding the unitary body to the glass tube.

20. The gas detecting apparatus of claim 13, wherein the gas detecting apparatus comprises at least one of an infrared (IR) based detector or photoacoustic detector.

* * * * *